(12) United States Patent
Lai

(10) Patent No.: US 6,961,109 B2
(45) Date of Patent: Nov. 1, 2005

(54) LIQUID CRYSTAL DISPLAYS

(75) Inventor: Han-Chung Lai, Taoyuan (TW)

(73) Assignee: AU Optronics Corporation, Hsinchu (TW)

( * ) Notice: Subject to any disclaimer, the term of this patent is extended or adjusted under 35 U.S.C. 154(b) by 53 days.

(21) Appl. No.: 10/645,703

(22) Filed: Aug. 22, 2003

(65) Prior Publication Data

US 2004/0090563 A1 May 13, 2004

(30) Foreign Application Priority Data

Oct. 25, 2002 (TW) ........................................ 91124962 A

(51) Int. Cl.⁷ ............................................. G02F 1/1343
(52) U.S. Cl. ..................................... 349/139; 349/143
(58) Field of Search ................................. 349/139–143

(56) References Cited

U.S. PATENT DOCUMENTS 6,063,653 A    5/2000   Lin et al. ..................... 438/160
6,429,909 B1 *  8/2002   Kim et al. ..................... 349/54
2002/0191124 A1 * 12/2002   Nakata ......................... 349/43
2003/0122983 A1 *  7/2003   Kim et al. ..................... 349/43

* cited by examiner

Primary Examiner—Dung T. Nguyen
(74) Attorney, Agent, or Firm—Thomas, Kayden, Horstemeyer & Risley

(57) ABSTRACT

The present invention provides a liquid crystal display including a substrate, a first gate line, a second gate line, an insulation layer, a data line, a passivation layer, a low dielectric constant layer, and a pixel electrode. The first gate line intersects with and is insulated from the second gate line. The pixel electrode overlaps a portion of the first gate line and a portion of the second gate line. The data line overlaps a portion of the first gate line. The portion of the first gate line overlapped by the pixel electrode is different from the portion of the first gate line overlapped by the data line. Therefore, the capacitance effect between the pixel electrode and the data line is reduced.

17 Claims, 6 Drawing Sheets

LIQUID CRYSTAL DISPLAYS

CROSS REFERENCE TO RELATED APPLICATIONS

This application claims priority of Taiwan Patent Application Serial No. 091124962 filed on Oct. 25, 2002.

FIELD OF INVENTION

The present invention relates to an LCD (Liquid Crystal Display) and its method of manufacture.

BACKGROUND OF THE INVENTION

Compared with a CRT (cathode ray tube) display, the LCD has the advantages of less weight, smaller volume, and lower radiation. Hence, we can expect that the LCD will substitute the CRT display as popular display in the future.

Conventional LCDs include a liquid crystal panel and a back light device. The liquid crystal panel includes a top substrate, a bottom substrate and a liquid crystal layer formed between the top substrate and the bottom substrate. The top substrate has a CF (Color Filter). The bottom substrate has a TFT (thin film transistor). Beside, a top polarizer is disposed on the top substrate and a bottom polarizer is disposed between the bottom polarizer and the back light device.

A Black Matrix may be plated on a CF to increase contrast and prevent mixture of colors and leakage of light. Hence, the LCD is better than the CRT display in resolution. However, if the resolution is enhanced without narrowing the pitch of the pixels, the aperture ratio of pixels will be reduced and the brightness of the LCD will decrease. Hence, narrowing of the Black Matrix or other alternatives to improve the brightness is an important issue.

SUMMARY OF THE INVENTION

One aspect of the present invention is to provide an LCD with better aperture ratio and a method for manufacturing the LCD.

Another aspect of the present invention is to reduce the disconnection caused by a signal line.

Still another aspect of the present invention is to avoid the light leakage of the LCD.

The other aspect of the present invention is to reduce the capacitance effect between a signal line and a pixel electrode.

In the present invention, a first gate line and a second gate are formed on a substrate. The first gate line and the second gate line are insulated from each other and are non-parallel to each other. After that, an insulation layer, a semiconductor layer, a data line, a passivation layer, a low dielectric constant layer and a pixel electrode are formed sequentially. The data line overlaps the first gate line. A dielectric constant layer is a low dielectric constant layer. The pixel electrode overlaps with a portion of the first gate line and a portion of the second gate line. The data line overlaps with a portion of the first gate line. The portion of the first gate line overlapped by the pixel electrode is different from the portion of the first gate line overlapped by the data line. Therefore, the capacitance effect between the pixel electrode and the data line is avoided. In the second embodiment of the present invention, another kind of LCD is disclosed. The first gate line is replaced by a gate line including a pair of gate lines that are parallel to each other and separated by a gap.

The advantages and spirit of the present invention may be further comprehended through the following detailed description and drawings.

BRIEF DESCRIPTION OF THE DRAWINGS

The present invention is illustrated by way of example and not limitation in the accompanying figures, in which like references indicate similar elements, and in which:

FIG. 1b is a cross-sectional diagram along the line I–I' of FIG. 1a;

FIG. 1c is a cross-sectional diagram along the line II–II' of FIG. 1a;

FIG. 2b is a cross-sectional diagram along the line III–III' in FIG. 2a;

FIG. 2c is a cross-sectional diagram along the line IV–IV' of FIG. 2a.

DETAILED DESCRIPTION

Figure 1A:
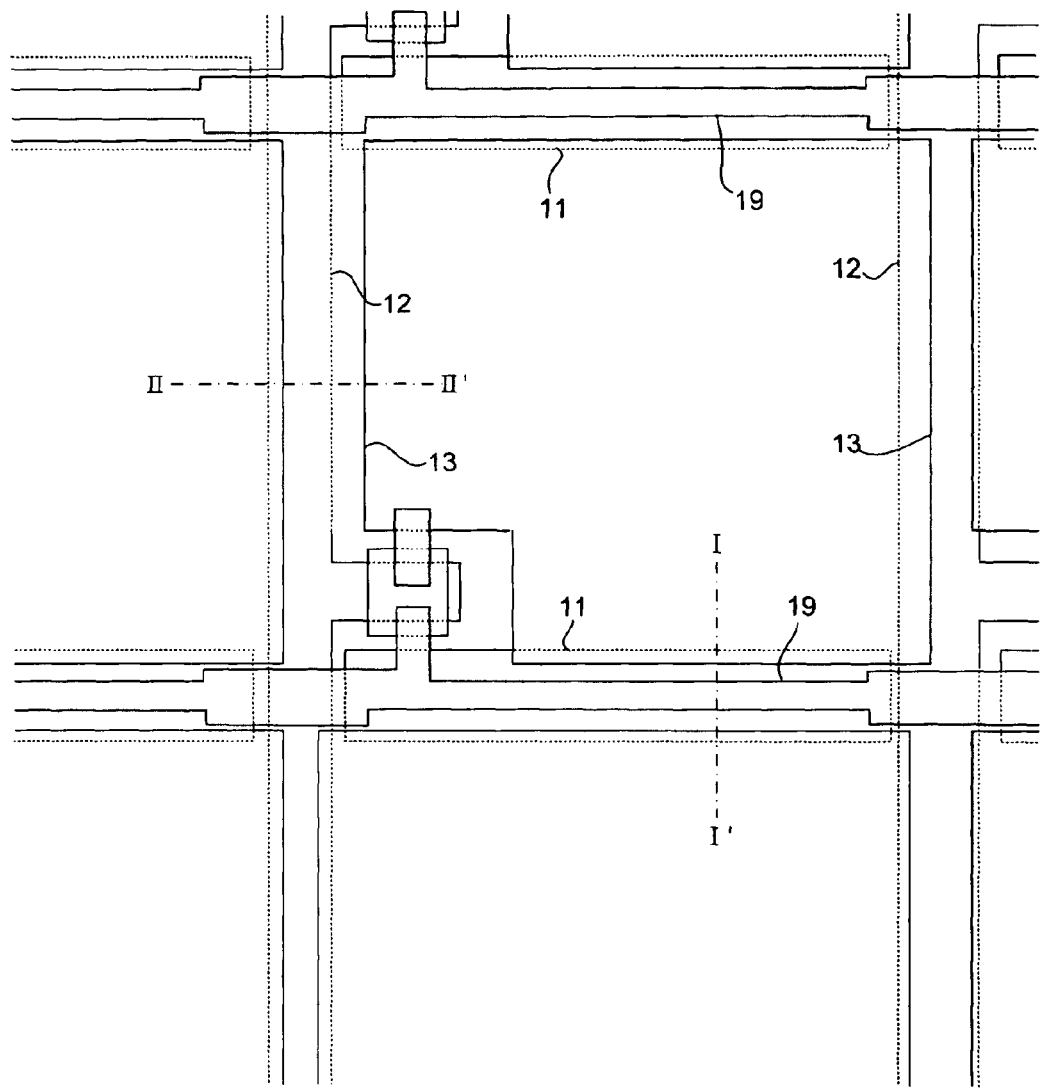
FIG. 1a is a schematic diagram of the first embodiment of the present invention.

FIG. 1a is a schematic diagram of the first embodiment of the present invention. The LCD of the present invention includes a plurality of first gate lines 11, a plurality of second gate lines 12, a plurality of data lines 19 and a plurality of pixel electrodes 13. Only one of the pixels is illustrated in FIG. 1a. The first gate line 11 and the second gate line 12 are insulated from each other and are non-parallel to each other. The data line 19 overlaps a portion of the first gate line 11. The pixel electrode 13 also overlaps a portion of the first gate line 11 and a portion of the second gate line 12. However, in the first gate line 11, the overlapping portion of the data line 19 is different from the overlapping portion of the pixel electrode 13.

Figure 1B:
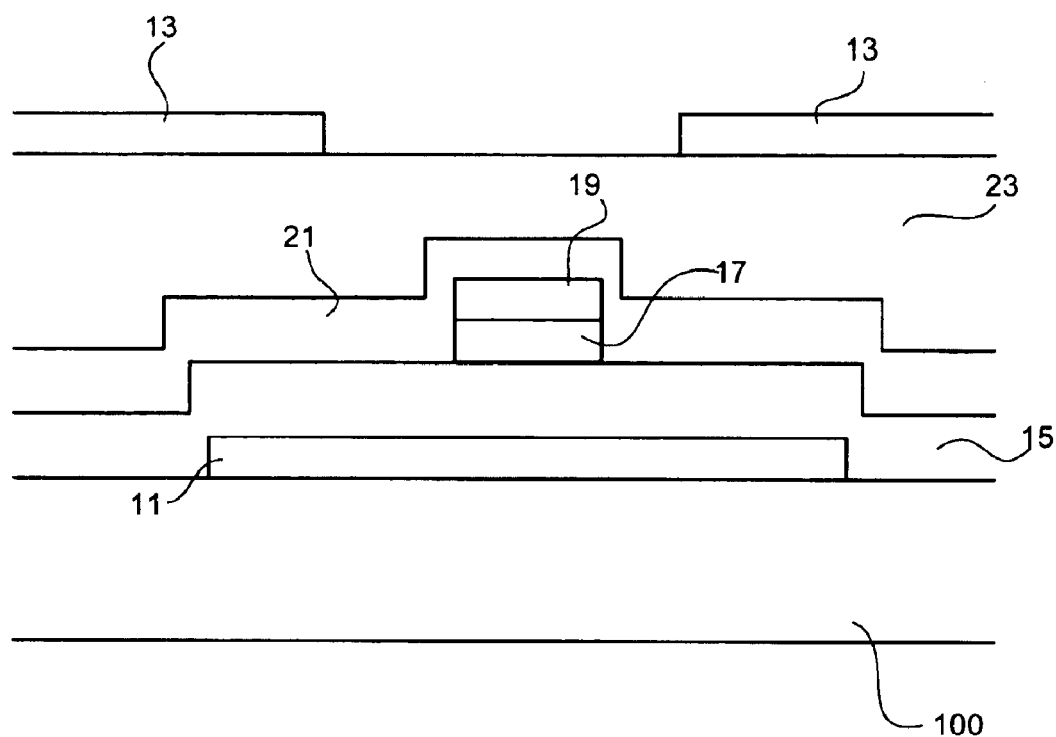

FIG. 1b is a cross-sectional diagram along the line I–I' of FIG. 1a. On a substrate, such as a glass substrate, the first gate line 11, an insulation layer 15, a semiconductor layer 17, a data line 19, a passivation layer 21, a low dielectric constant layer 23 and a pixel electrode 13 are formed sequentially. Obviously, the portion that the data line 19 overlapping the first gate line 11 is different from the portion of the pixel electrode 13 overlapping the first gate line 11.

Figure 1C:
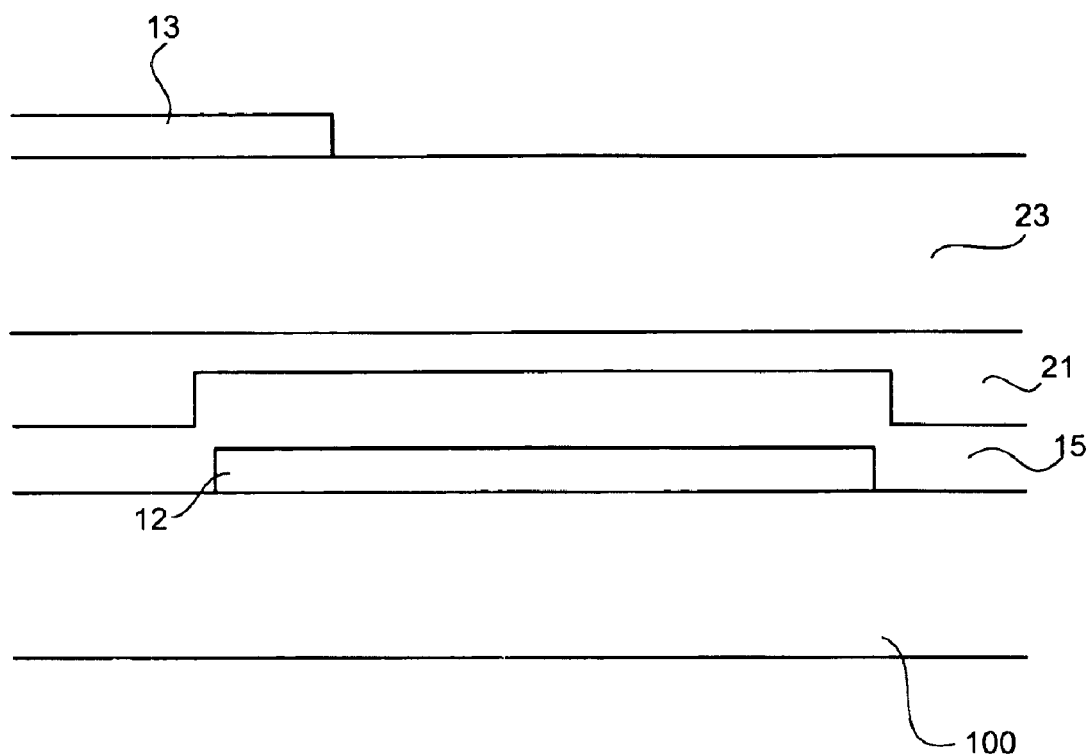

FIG. 1c is a cross-sectional diagram along the line II–II' of FIG. 1a. In the present invention, the second gate line 12 and the insulation layer 15 are formed sequentially on the substrate 100. Thus, after the semiconductor layer 17 and the data line 19 are formed as illustrated in FIG. 1b, the passivation layer 21, the low dielectric constant layer 23 and the pixel electrode 13 are formed sequentially. As shown in FIG. 1c, the pixel electrode 13 overlaps a portion of the second gate line 12.

In the present invention, the material of the insulation layer 15 includes an $Si_3N_4$ layer depositing above the first gate line 11, the second gate line 12 and the substrate 100. The material of the semiconductor layer 17 includes an undoped Si amorphous layer and a doped Si amorphous layer. The material of passivation layer 21 includes $Si_3N_4$. The low dielectric constant layer 23 is a transparent material with low dielectric constant, such as the acrylic. The material of the pixel electrode 13 includes ITO (Indium Tin Oxide).

Figure 2A:
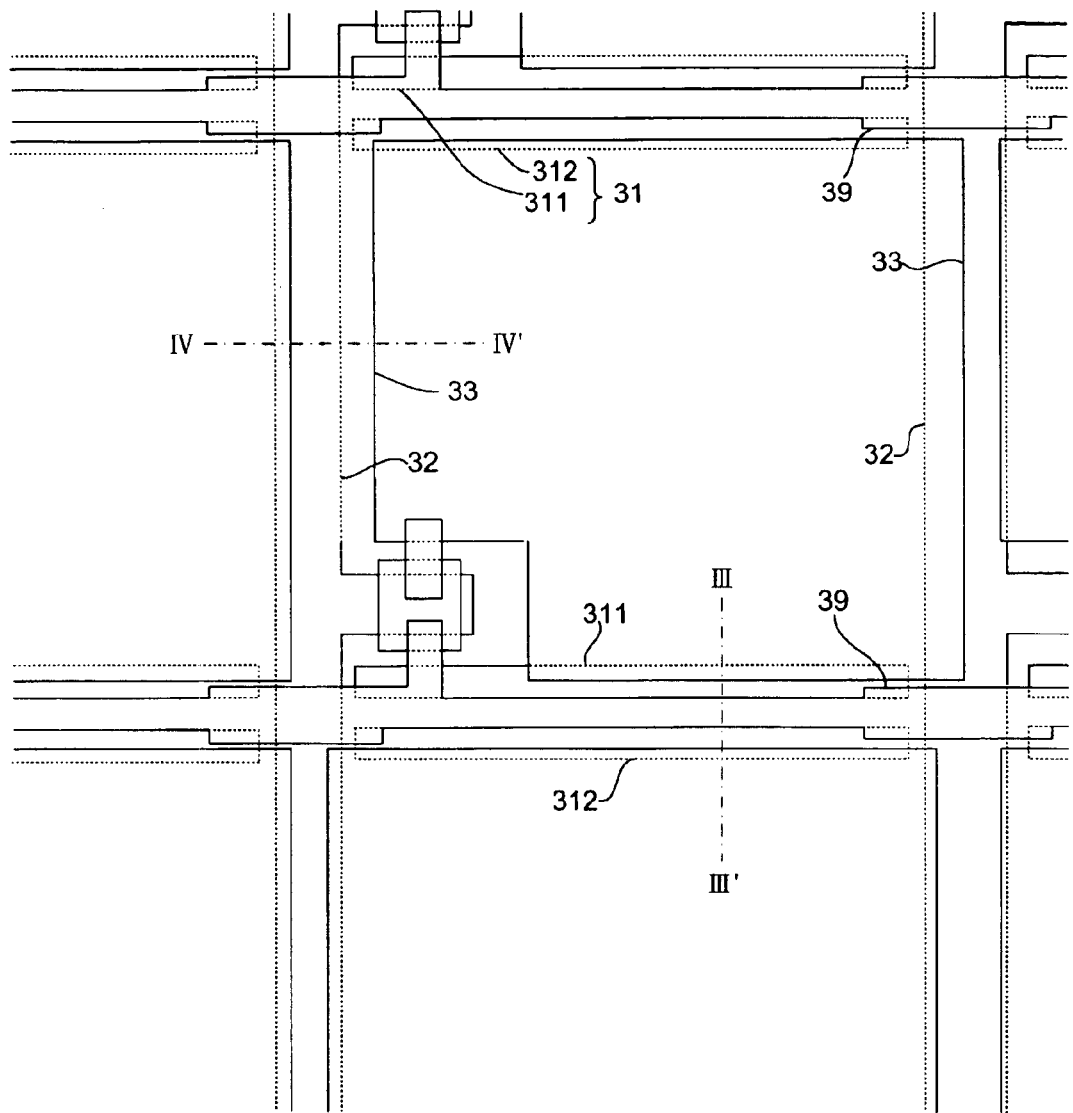
FIG. 2a is a schematic diagram of the second embodiment of the present invention.

FIG. 2a is a schematic diagram of the second embodiment of the present invention. In the present invention, an LCD includes a plurality of gate line pairs 31, a plurality of gate lines 32, a plurality of data lines 39 and a plurality of pixel electrodes 33. Only one pixel is illustrated in FIG. 2a. The gate line pair 31 and the gate line 32 are insulated from each other and are non-parallel to each other. The gate line pair 31 includes a first gate line 311 and a second gate line 312. The first gate line 311 parallels the second gate line 312 with a gap 314 therebetween. The data line 39 overlaps a portion of the gate line pair 31 and the gap 314. Besides, the pixel electrode 33 also overlaps a portion of the gate line pair 31. However, in the gate line pair 31, the overlapping portion of the data line 39 is different from the overlapping portion of the pixel electrode 33. Likewise, the pixel electrode 33 also overlaps a portion of the gate line 32.

In the second embodiment, as shown in FIG. 2a, the data line 39 overlaps the gap 314 of the gate line pair 31 and a portion of the gate line pair 31. The pixel electrode 33 overlaps a portion of the second gate line 312. The pixel electrode 33 overlaps a portion of the first gate line 311.

Figure 2B:
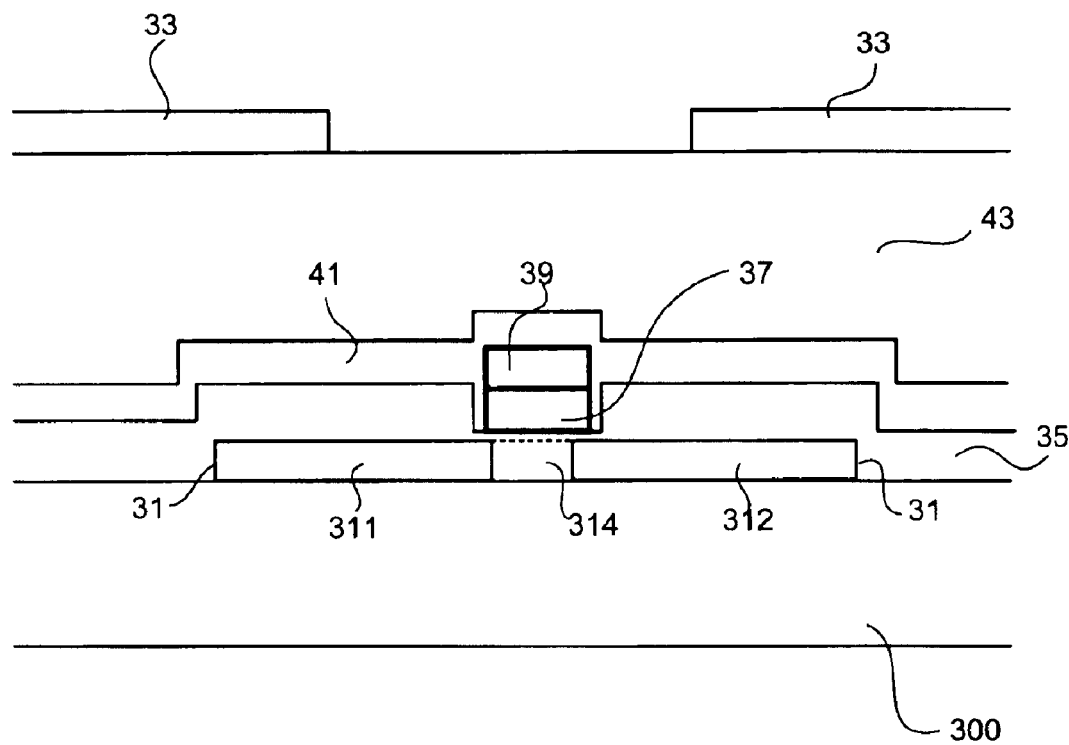

FIG. 2b is a cross-sectional diagram along the line III–III' of FIG. 2a. On a substrate, such as a glass substrate, the gate line pair 31, an insulation layer 35, a semiconductor layer 37, a data line 39, a passivation layer 41, a low dielectric constant layer 43 and a pixel electrode 33 are formed sequentially. Obviously, the portion that the data line 39 overlaps the gate line pair 31 is different from the portion of the pixel electrode 33 overlapping the gate line pair 31.

Figure 2C:
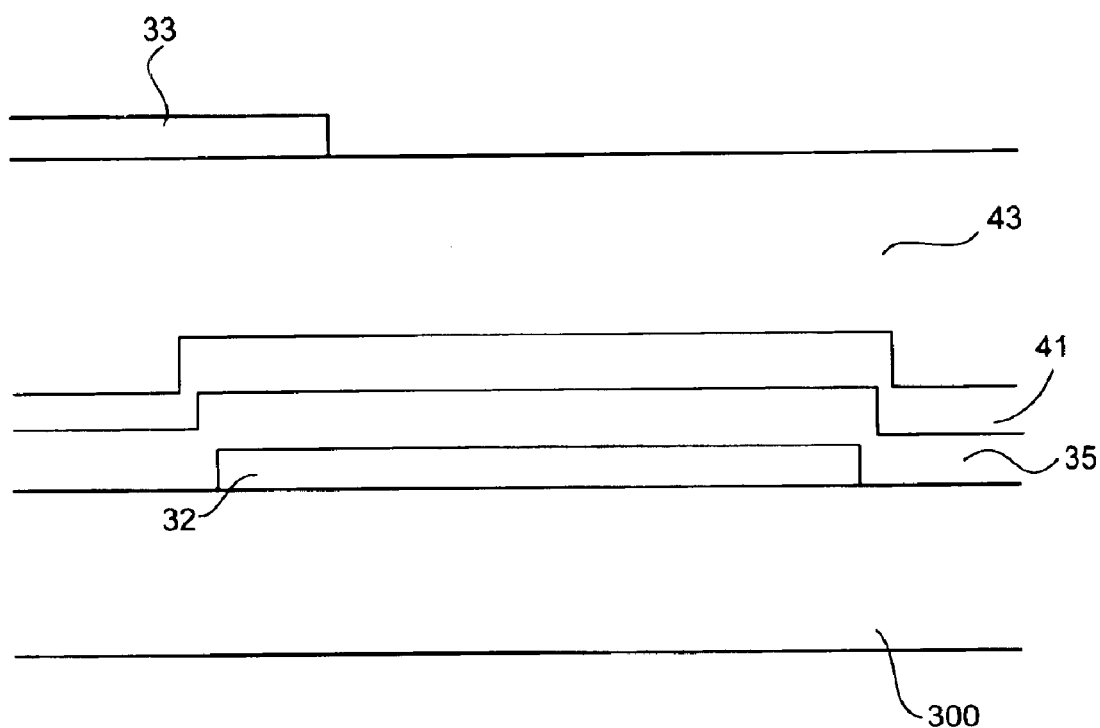

FIG. 2c is a cross-sectional diagram along the line IV–IV' of FIG. 2a. In the present invention, the gate line 32 and the insulation layer 35 are formed sequentially on the substrate 300. Thus, after the semiconductor layer 37 and the data line 39 are formed as illustrated in FIG. 2b, the passivation layer 41, the low dielectric constant layer 43 and the pixel electrode 33 are formed sequentially. As shown in FIG. 2c, the pixel electrode 33 overlaps a portion of the gate line 32.

In the present invention, the material of the insulation layer 35 includes an $Si_3N_4$ layer depositing above the gate line pair 31, the gate line 32 and the substrate 300. The material of the semiconductor layer 37 includes an undoped Si amorphous layer and a doped Si amorphous layer. The material of passivation layer 41 includes $Si_3N_4$. The low dielectric constant layer 43 is a transparent material with low dielectric constant, such as the acrylic. The material of the pixel electrode 33 includes ITO (Indium Tin Oxide).

The structure of an LCD proposed in the present invention may effectively increase the aperture ratio and avoid the leakage of light. Moreover, it may reduce the disconnection caused by a signal line to reduce the capacitance effect between a signal line and a pixel electrode.

In the foregoing specification, the invention has been described with reference to specific embodiments. However, various modifications and changes can be made without departing from the scope of the present invention as set forth in the claims. Accordingly, the specification and figures are to be regarded in an illustrative rather than a restrictive sense, and all such modifications are intended to be included within the scope of present invention as claimed.

What is claimed is:

1. A liquid crystal display, comprising:
   a substrate;
   a first gate line, comprising a first portion and a second portion;
   a second gate line, said first gate line and said second gate line being disposed on said substrate and being insulated from each other, said first gate line being non-parallel to said second gate line;
   an insulation layer disposed above said first gate line and said second gate line;
   a data line, said data line and said first portion overlapping, said insulation layer being disposed between said data line and said first portion; and
   a pixel electrode disposed above said data line, said pixel electrode and said second portion overlapping.

2. The liquid crystal display according to claim 1, wherein said first portion is different from said second portion.

3. The liquid crystal display according to claim 1, wherein said pixel electrode and said second gate line overlap.

4. The liquid crystal display according to claim 1, wherein said liquid crystal display further comprises a semiconductor layer disposed above said insulation layer, said semiconductor layer comprises an undoped amorphous silicon layer and a doped amorphous silicon layer.

5. The liquid crystal display according to claim 1, wherein said liquid crystal display further comprises a passivation layer disposed above said data line.

6. The liquid crystal display according to claim 1, wherein said liquid crystal display further comprises a low-dielectric-constant layer disposed above said passivation layer.

7. The liquid crystal display according to claim 1, wherein said first gate line comprises a pair of gate lines, said pair of gate lines are parallel to each other and separated by a gap.

8. The liquid crystal display according to claim 7, wherein said data line, said gap and a part of said pair of gate lines overlap.

9. A liquid crystal display, comprising:
   a substrate;
   a first gate line, comprising a first portion and a second portion;
   a second gate line, said first gate line and said second gate line being disposed on said substrate and being insulated from each other, said first gate line being non-parallel to said second gate line;
   an insulation layer disposed above said first gate line and said second gate line;
   a data line, said data line and said first portion overlapping, said insulation layer being disposed between said data line and said first portion; and
   a pixel electrode disposed above said data line, said pixel electrode and said second portion overlapping;
   wherein said first portion is different from said second portion.

10. The liquid crystal display according to claim 9, wherein said pixel electrode and said second gate line overlap.

11. The liquid crystal display according to claim 9, wherein said liquid crystal display further comprises a semiconductor layer disposed above said insulation layer, said semiconductor layer comprises an undoped amorphous silicon layer and a doped amorphous silicon layer.

12. The liquid crystal display according to claim 9, wherein said liquid crystal display further comprises a passivation layer disposed above said data line.

13. The liquid crystal display according to claim 9, wherein said liquid crystal display further comprises a low-dielectric-constant layer disposed above said passivation layer.

14. The liquid crystal display according to claim 9, wherein said first gate line comprises a pair of gate lines, said pair of gate lines are parallel to each other and separated by a gap.

15. The liquid crystal display according to claim 14, wherein said data line, said gap and a part of said pair of gate lines overlap.

16. A manufacture method of a liquid crystal display, said method comprising:

provide a substrate;

forming a first gate line and a second gate line, said first gate line and said second gate line being disposed on said substrate and being insulated from each other, said first gate line being non-parallel to said second gate line;

forming an insulation layer disposed above said first gate line and said second gate line;

forming a data line, said data line and a first portion of said first gate line overlapping, said insulation layer being disposed between said data line and said first portion;

forming a passivation layer disposed above said data line;

forming a low-dielectric-constant layer disposed above said passivation layer; and forming a pixel electrode disposed above said low-dielectric-constant layer, said pixel electrode and a second portion of said first gate line overlapping;

wherein said first portion is different from said second portion.

17. The liquid crystal display according to claim 16, wherein said liquid crystal display further comprises a semiconductor layer disposed above said insulation layer, said semiconductor layer comprises an undoped amorphous silicon layer and a doped amorphous silicon layer.

* * * * *